United States Patent
Jeong et al.

(10) Patent No.: US 8,590,952 B2
(45) Date of Patent: Nov. 26, 2013

(54) CRASH BOX OF BUMPER FOR VEHICLE

(75) Inventors: Phil Jung Jeong, Yongin-si (KR); Hyun Kim, Hwaseong-si (KR); Jun Mo Ku, Hwaseong-si (KR); Hee Jun Jeong, Hwaseong-si (KR); Do Hoi Koo, Ulsan (KR); Do Hyun Kim, Busan (KR)

(73) Assignees: Hyundai Motor Company, Seoul (KR); Kia Motors Corp., Seoul (KR); Sung Woo Hitech Co., Ltd., Busan (KR)

( * ) Notice: Subject to any disclaimer, the term of this patent is extended or adjusted under 35 U.S.C. 154(b) by 204 days.

(21) Appl. No.: 13/169,822

(22) Filed: Jun. 27, 2011

(65) Prior Publication Data

US 2012/0139273 A1 Jun. 7, 2012

(30) Foreign Application Priority Data

Dec. 6, 2010 (KR) .................. 10-2010-0123377

(51) Int. Cl.
*B60R 19/26* (2006.01)

(52) U.S. Cl.
USPC ........................................ 293/132

(58) Field of Classification Search
USPC .......... 293/132, 133, 102, 120, 155; 188/377, 188/371, 374; 296/187.03, 187.09, 203.02; 280/751, 752
See application file for complete search history.

(56) References Cited

U.S. PATENT DOCUMENTS

| | | | | |
|---|---|---|---|---|
| 3,564,688 A | * | 2/1971 | De Gain | 9/897.2 |
| 3,983,963 A | * | 10/1976 | Nakamura | 188/377 |
| 3,995,901 A | * | 12/1976 | Filbert et al. | 293/136 |
| 5,727,826 A | * | 3/1998 | Frank et al. | 293/102 |
| 5,772,267 A | * | 6/1998 | Heim et al. | 293/133 |
| 6,000,738 A | * | 12/1999 | Stewart et al. | 293/102 |
| 6,003,930 A | * | 12/1999 | Frank et al. | 296/133 |
| 6,270,131 B1 | * | 8/2001 | Martinez et al. | 293/132 |
| 6,481,690 B2 | * | 11/2002 | Kariatsumari et al. | 293/155 |
| 6,502,874 B2 | * | 1/2003 | Kajiwara et al. | 293/133 |
| 6,705,653 B2 | * | 3/2004 | Gotanda et al. | 293/132 |
| 6,712,410 B2 | * | 3/2004 | Kudelko et al. | 293/102 |
| 6,834,898 B2 | * | 12/2004 | Wang et al. | 293/118 |
| 6,971,694 B2 | * | 12/2005 | Sakuma et al. | 293/133 |
| 7,000,975 B2 | * | 2/2006 | Haneda et al. | 296/132 |
| 7,093,866 B2 | * | 8/2006 | Toneatti et al. | 293/133 |
| 7,131,674 B2 | * | 11/2006 | Evans et al. | 293/120 |
| 7,344,008 B1 | * | 3/2008 | Jonsson et al. | 188/377 |
| 7,543,865 B2 | * | 6/2009 | Hodoya et al. | 293/102 |
| 8,020,907 B2 | * | 9/2011 | Wibbeke et al. | 293/133 |

(Continued)

FOREIGN PATENT DOCUMENTS

JP 2009-280141 A 12/2009
KR 10-2010-0049305 A 5/2010

*Primary Examiner* — Kiran B Patel
(74) *Attorney, Agent, or Firm* — Morgan, Lewis & Bockius LLP

(57) ABSTRACT

A crash box of a bumper for a vehicle is provided in the bumper to absorb collision energy produced in a collision. The crash box is constructed such that upper and lower horizontal partitions and a plurality of vertical partitions are connected to each other to form a lattice structure having a plurality of hollow portions, and each of the vertical partitions is formed to be bent at a middle portion thereof. A vertical partition located at the outermost position of the hollow portions forming the lattice structure is bent towards the inside of the crash box, and a vertical partition provided in a middle portion of the crash box is bent to the outside or inside of the vehicle.

6 Claims, 3 Drawing Sheets

(56) References Cited

U.S. PATENT DOCUMENTS

| | | | |
|---|---|---|---|
| 8,136,871 B2* | 3/2012 | Yoshida et al. | 296/205 |
| 8,152,211 B2* | 4/2012 | Klimek | 293/102 |
| 8,201,861 B2* | 6/2012 | Handing et al. | 293/132 |
| 2002/0101086 A1* | 8/2002 | Koch et al. | 293/133 |
| 2005/0016807 A1* | 1/2005 | Braymand | 188/371 |
| 2005/0104392 A1* | 5/2005 | Liebhard et al. | 293/132 |
| 2007/0251782 A1* | 11/2007 | Chen et al. | 188/377 |
| 2008/0041268 A1* | 2/2008 | Seitzberger et al. | 105/392.5 |
| 2011/0095549 A1* | 4/2011 | Moen et al. | 293/132 |

* cited by examiner

CRASH BOX OF BUMPER FOR VEHICLE

CROSS-REFERENCE TO RELATED APPLICATIONS

The present application claims priority to Korean Patent Application No. 10-2010-0123377 filed Dec. 6, 2010, the entire contents of which application is incorporated herein for all purposes by this reference.

BACKGROUND OF THE INVENTION

1. Field of the Invention

The present invention relates generally to a crash box of a bumper for a vehicle and, more particularly, to a crash box of a bumper for a vehicle, which is intended to very efficiently absorb the energy produced in a vehicle collision.

1. Description of the Related Art

Generally, bumpers are provided on the front and back of a vehicle to absorb the collision energy applied to a vehicle body in a collision or a rear-end collision, thus preventing parts of the vehicle from being damaged and guaranteeing a passenger's safety.

Further, a crash box shown in FIG. 1 is installed between each bumper and a vehicle body frame so as to absorb impact in a low-speed collision, thus minimizing damage to a vehicle and a passenger.

Such a crash box is constructed so that vertical partitions 1 and horizontal partitions 2, which are made of a material comprising steel or iron, are connected to each other to form hollow portions 3. In the event of a vehicle collision, the vertical partitions 1 or the horizontal partitions 2 collapse to absorb impact.

The conventional crash box is problematic in that the crash box is thick, so that its weight is heavy, and the crash box is broken or deformed at random in the event of a collision, so that the performance of absorbing collision energy is poor. Further, the conventional crash box is problematic in that, if the crash box collapses to the outside of a vehicle in the event of a vehicle collision, other parts including a headlamp washer may be damaged. However, these problems have been never addressed.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Accordingly, the present invention has been made keeping in mind the above problems occurring in the related art, and various aspects of the present invention provide for an improved crash box, the weight of which can be reduced, thus enabling a load transmitted to a vehicle body in the event of a collision to be reduced.

Other aspects of the present invention provide for a crash box, which has a structure that is advantageous to absorb collision energy, and is sequentially deformed by collision force, thus being capable of absorbing high collision energy.

Further aspects of the present invention is provide for a crash box, which is constructed so that it does not collapse to the outside of a vehicle when the crash box is mounted to the vehicle.

The crash box may be constructed such that upper and lower horizontal partitions and a plurality of vertical partitions are connected to each other to form a lattice structure having a plurality of hollow portions, and at least one of the vertical partitions is formed to be bent at a middle portion thereof, and two vertical partitions located at outermost positions are bent towards an inside of the crash box.

According to an aspect of the present invention, an outermost partition may be bent towards an inside of the vehicle, an innermost partition may be bent towards an outside of the vehicle, and a middle partition may be bent towards the inside or outside of the vehicle.

According to another aspect of the present invention, the crash box may further include a middle horizontal partition to form a vertically layered structure, and vertical partitions placed above the middle horizontal partition and vertical partitions placed under the middle horizontal partition may be bent in the same direction.

According to a further aspect of the present invention, a bent portion of each of the vertical partitions may be bent at an angle from 5° to 10°.

According to another aspect of the present invention, the vertical partitions may have different thicknesses.

According to another aspect of the present invention, the vertical partitions may be arranged in such a way that thicknesses thereof are increased in a direction from the outside to the inside of the vehicle when the crash box is mounted to the vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
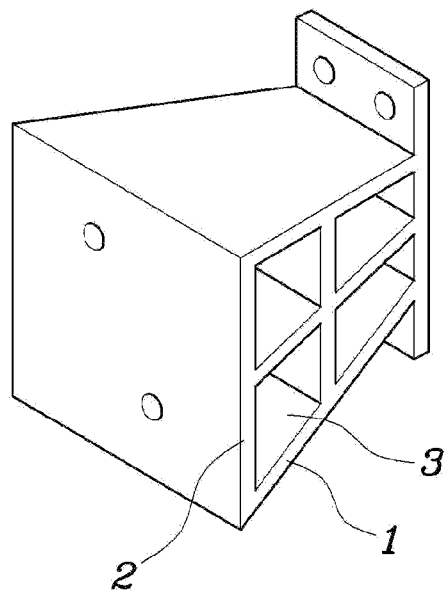
FIG. 1 is a view showing a conventional crash box of a bumper for a vehicle.
Figure 2:
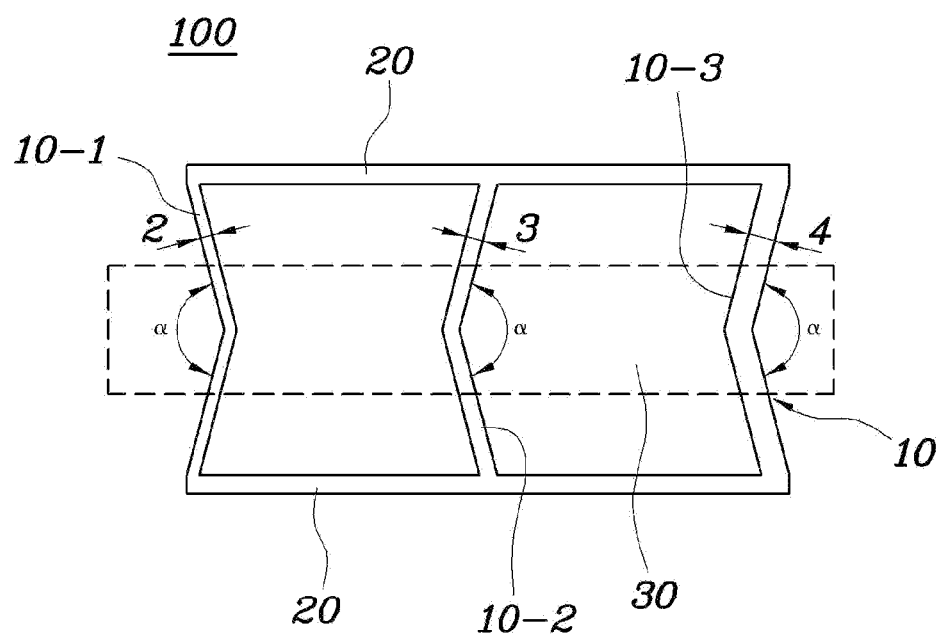
FIG. 2 is a sectional view showing an exemplary crash box of a bumper for a vehicle, according to the present invention.
Figure 3:
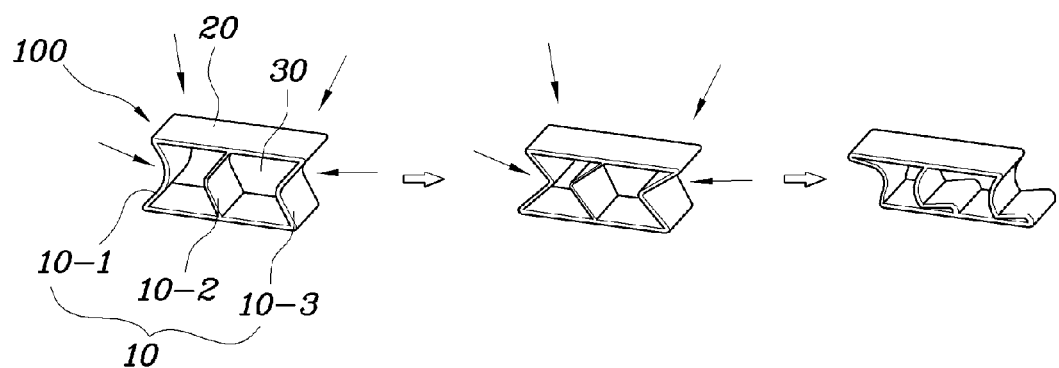
FIG. 3 is a perspective view showing the use of the crash box of the bumper for the vehicle of FIG. 2.
Figure 4:
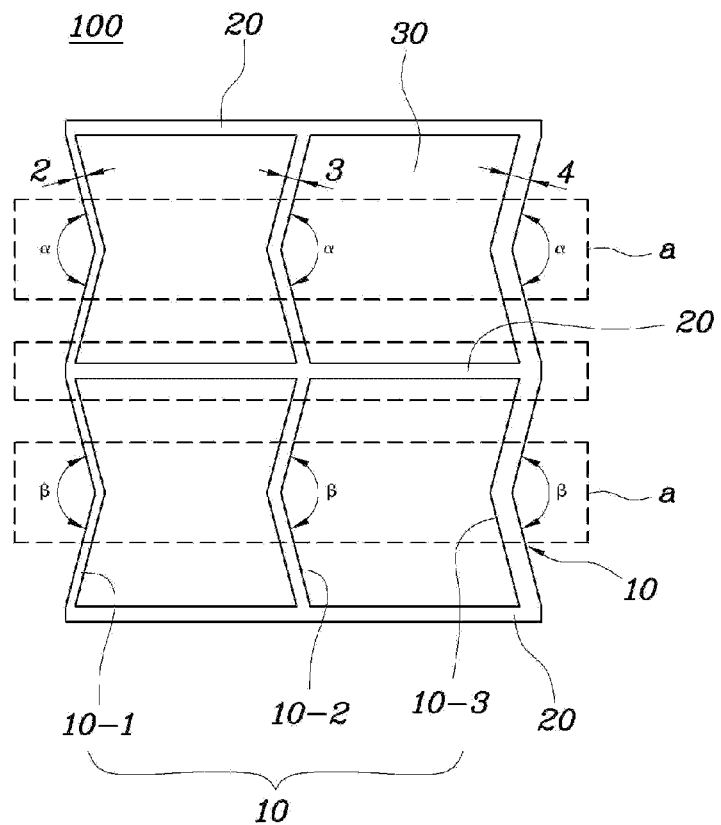
FIG. 4 is a sectional view showing exemplary crash box of a bumper for a vehicle, according to the present invention.

FIG. 2 is a sectional view showing a crash box 100 of a bumper for a vehicle, according to various embodiments of the present invention, and FIG. 3 is a perspective view showing the use of the crash box 100 of the bumper for the vehicle of FIG. 2. In FIGS. 2 to 4, the upper portion of each drawing corresponds to a rear portion when the crash box is mounted to the vehicle, and the section of each drawing is viewed from the top of the vehicle.

As shown in the drawings, the crash box 100 of the bumper for the vehicle according to various embodiments of the present invention is provided in the bumper so as to absorb collision energy produced in a vehicle collision, and is constructed such that upper and lower horizontal partitions 20 and a plurality of vertical partitions 10 are connected to each other to form a lattice structure having a plurality of hollow portions 30.

The crash box 100 including the plurality of vertical partitions 10 and the horizontal partitions 20 is manufactured by performing aluminum extrusion.

Preferably, as shown in FIG. 3, the plurality of vertical partitions 10 are set such that bent portions thereof are in different directions in the event of a vehicle collision.

That is, the vertical partitions 10 are constructed to be bent at middle portions thereof. An outermost vertical partition 10 of the hollow portions 30 that forms the lattice structure is bent towards the inside of the crash box 100, and a middle vertical partition 10 is bent towards the outside or inside of the vehicle.

In other words, the vertical partitions 10 include the outermost partition 10-1 located at the outermost position of the vehicle, a middle partition 10-2, and an innermost partition 10-3 placed towards the center in a transverse direction of the vehicle. In the event of a vehicle collision, the outermost partition 10-1 is placed to be bent towards the inside of the vehicle, and the middle partition 10-2 and the innermost partition 10-3 are placed to be bent towards the outside of the vehicle.

As such, the different bending directions of the vertical partitions 10 allow the amount of absorbing collision energy to be maximized, thus maximally preventing internal parts of the vehicle from being damaged.

To this end, the inventors of this invention propose a construction wherein a predetermined inclination angle $\alpha$ is provided to each vertical partition 10 so as to immediately bend the vertical partition 10 in the event of a vehicle collision.

The outside of the outermost partition 10-1 has an inclination angle $\alpha$, while the inside of each of the middle partition 10-2 and the innermost partition 10-3 has an inclination angle $\alpha$. Further, the bending direction of the outermost partition 10-1 is set to be different from that of each of the middle partition 10-2 and the innermost partition 10-3.

Therefore, as such, when the inclination angles are provided to the vertical partitions 10 and the bending directions of the vertical partitions 10 are set to be different from each other, the crash box 100 may be deformed sequentially from the front to the rear thereof in the event of a vehicle collision. Such a construction allows collision energy to be sequentially absorbed, thus maximizing the amount of collision energy that is absorbed.

Further, the outermost partition 10-1 and the innermost partition 10-3 are bent and buckled towards the inside of the crash box 100. Unlike the outward buckling, the above inward buckling prevents the outermost partition 10-1 and the innermost partition 10-3 from being in contact with other parts, and eliminates factors that negatively affect the performance of absorbing collision energy, thus preventing damage to the other parts.

Moreover, if the middle partition 10-2 is bent in the same direction as the innermost partition 10-3, that is, bent to the outside of the vehicle, in consideration of the collision-energy absorbing performance, the load transmitted to a vehicle body may be further reduced.

Here, each vertical partition 10 has the inclination angle $\alpha$ from 5° to 10° in consideration of the bending direction and the ability of absorbing collision energy in the event of a vehicle collision. Results of optimization analysis have shown that it is preferable for the inclination angle of the vertical partition 10 to be 5°.

The outermost partition 10-1, the middle partition 10-2 and the innermost partition 10-3 have different thicknesses so as to absorb a larger amount of collision energy in the event of a vehicle collision.

That is, as shown in FIG. 2, the vertical partitions 10 are formed such that their thicknesses are increased in a direction from the outside to the inside of the vehicle, that is, in a direction from the outermost partition 10-1 to the innermost partition 10-3.

According to the results of optimization analysis of thickness of the vertical partitions 10 according to various embodiments of the present invention, it is preferable that the outermost partition 10-1 have the thickness of approximately 2.0 t, the middle partition 10-2 have the thickness of approximately 3.0 t, and the innermost partition 10-3 have the thickness of approximately 4.0 t.

Further, when the outermost partition 10-1, the middle partition 10-2 and the innermost partition 10-3 having different thicknesses are compared with those having the same thickness, the partitions 10-1, 10-2 and 10-3 having the different thicknesses can achieve the lightness of the vehicle.

Figure 5:
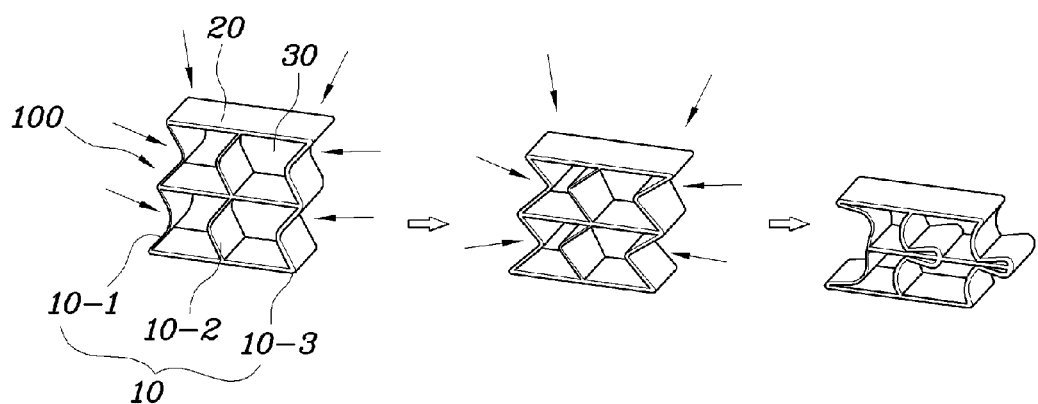
FIG. 5 is a perspective view showing the use of the crash box of the bumper for the vehicle of FIG. 4.

FIG. 4 is a sectional view showing a crash box 100 of a bumper for a vehicle, according to various embodiments of the present invention, and FIG. 5 is a perspective view showing the use of the crash box 100 of the bumper for the vehicle of FIG. 4.

The crash box 100 of FIG. 4 is constructed such that a plurality of vertical partitions 10 and horizontal partitions 20 are connected to each other to form a lattice structure having a plurality of hollow portions 30, and the hollow portions 30 are layered.

That is, the horizontal partition 20 is further provided between the plurality of hollow portions 30 forming the lattice structure, thus creating a vertically layered structure. The hollow portions 30 of the vertically layered structure are formed in the same shape to correspond to each other.

Thus, the hollow portions 30 of the layered structure allow a larger amount of collision energy to be absorbed even when the crash box 100 collapses in the event of a vehicle collision.

Such a crash box 100 has the layered structure, thus doubly absorbing the collision energy of a vehicle, as shown in FIG. 5.

Here, the vertical partitions 10 have the inclination angle $\beta$ from 5° to 10° in consideration of the bending direction and the ability of absorbing collision energy in the event of a vehicle collision, as in the above-described examples. The results of optimization analysis have shown that it is preferable for the inclination angle of the vertical partitions 10 to be 5°.

Figure 6:
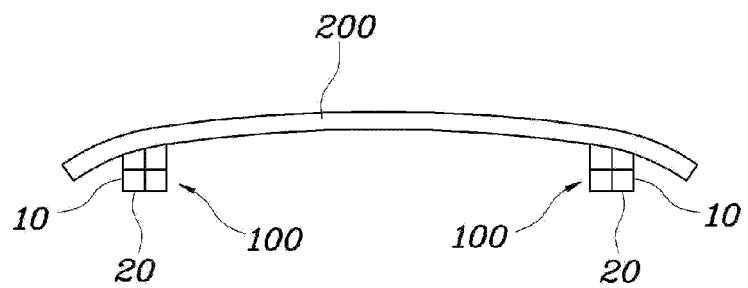
FIG. 6 is a sectional view showing the crash boxes of the bumper for the vehicle according to the present invention, which are mounted to a rear bumper.

FIG. 6 shows the crash boxes 100 according to the present invention, which are mounted to the inner surface of a rear bumper 200 of the vehicle.

If impact is applied from the rear of the vehicle with the crash boxes 100 being mounted to the rear bumper 200 of the vehicle, collision energy is transmitted in the directions shown by arrows of FIGS. 3 and 5. The upper portions of FIGS. 3 and 5 correspond to the rear portion of the vehicle when each crash box is mounted to the vehicle.

Next, the vertical partitions 10 of the crash box 100 which is subjected to collision energy are bent towards the inside of the crash box 100 because the vertical partitions 10 have inclination angles α and β.

The vertical partitions 10 are bent as such, thus increasing the rate of absorbing collision energy. Further, the vertical partitions 10 are bent towards the inside of the crash box 100, thus preventing damage to other parts of the vehicle.

As a result, such a crash box 100 maximally prevents other parts from being damaged by external impact, in addition to maximally guaranteeing a passenger's safety.

Meanwhile, it is to be understood that each of the crash boxes shown in FIGS. 2 to 5 corresponds to the crash box placed on the left of FIG. 6, that is, the crash box placed on the right of the rear bumper of the vehicle.

As described above, the present invention provides a crash box, in which vertical partitions have different thicknesses according to the positions thereof so that the lightness of the crash box may be achieved, and the load transmitted to a vehicle body in the event of a collision may be reduced.

Further, the present invention provides a crash box, in which a middle portion of a vertical partition is bent at a predetermined angle so as to absorb collision energy, thus absorbing collision energy with a superior degree of performance.

Furthermore, the present invention provides a crash box, which may be constructed such that a horizontal partition is further provided in the crash box to form a two-layered structure, thus allowing the crash box to be sequentially deformed while collision energy is absorbed by a bent portion of a vertical partition, therefore achieving the absorption of high collision energy.

Further, the present invention provides a crash box, which does not collapse to the outside of a vehicle when the crash box is mounted to the vehicle, thus preventing other parts of the vehicle from being damaged.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A crash box provided in a bumper for a vehicle to absorb collision energy produced in a collision, the crash box comprising:
   rearward and forward horizontally-extending partitions and a plurality of vertical partitions interconnecting the rearward and forward horizontally-extending partitions to form a lattice structure having a plurality of hollow portions wherein the rearward horizontally-extending partition is mounted to the vehicle; and
   wherein at least one of the vertical partitions is bent about a vertical axis at a middle portion thereof, and two vertical partitions located at outermost positions are bent about a vertical axis towards an inside of the crash box.

2. The crash box as set forth in claim 1, wherein the vertical partitions comprise an outermost partition located at an outer position when the crash box is mounted to the vehicle, an innermost partition located at an inner position when the crash box is mounted to the vehicle, and a middle partition, and
   the outermost partition is bent towards an inside of the vehicle, the innermost partition is bent towards an outside of the vehicle, and the middle partition is bent towards the inside or outside of the vehicle.

3. The crash box as set forth in claim 1, further comprising:
   a middle horizontal partition provided to form a vertically layered structure, vertical partitions placed above the middle horizontal partition and vertical partitions placed under the middle horizontal partition being bent in a same direction.

4. The crash box as set forth in claim 3, wherein a bent portion of each of the vertical partitions is bent at an angle from 5° to 10°.

5. The crash box as set forth in claim 1, wherein the vertical partitions have different thicknesses.

6. The crash box as set forth in claim 5, wherein the vertical partitions are arranged in such a way that thicknesses thereof are increased in a direction from the outside to the inside of the vehicle when the crash box is mounted to the vehicle.

* * * * *